United States Patent [19]

Kirkmyer

[11] Patent Number: 5,323,833
[45] Date of Patent: Jun. 28, 1994

[54] PORTABLE POTABLE WATER SYSTEM
[75] Inventor: John C. Kirkmyer, Richmond, Va.
[73] Assignee: Emergency Water Systems, Inc., Ashland, Va.
[21] Appl. No.: 20,958
[22] Filed: Feb. 22, 1993
[51] Int. Cl.⁵ .............................................. B67B 7/00
[52] U.S. Cl. ....................................... 222/1; 222/173; 222/608
[58] Field of Search ................ 222/1, 131, 173, 146.2, 222/146.5, 318, 564, 608, 626

[56] References Cited

U.S. PATENT DOCUMENTS

| | | |
|---|---|---|
| 918,512 | 4/1909 | Cramer . |
| 1,466,175 | 8/1923 | Kramer . |
| 1,892,519 | 12/1932 | Schottgen . |
| 2,437,618 | 3/1948 | Schottgen et al. . |
| 2,923,440 | 2/1960 | Ve Horn . |
| 4,089,446 | 5/1978 | Logan, III et al. . |
| 4,690,308 | 9/1987 | Cavanaugh et al. ............ 222/318 X |
| 4,911,330 | 3/1990 | Vlaanderen et al. ........... 222/626 X |
| 5,154,317 | 10/1992 | Roppolo, III .................. 222/608 X |

Primary Examiner—Gregory L. Huson
Attorney, Agent, or Firm—Lowe, Price, Leblanc & Becker

[57] ABSTRACT

A portable potable water system comprises a tank assembly and system component housing, both mounted on a base structure for ease of transportability. The potable water system includes a circulation system to maintain potability of the water and prevent freezing. A delivery system is provided which supplies the potable water to a user or site. The potable water system components are enclosed in the housing to protect the system from adverse climatic conditions and provide a more secure environment. The system is constructed of components which maintain the potability of the water.

18 Claims, 2 Drawing Sheets

PORTABLE POTABLE WATER SYSTEM

FIELD OF THE INVENTION

The present invention relates to a portable potable water system designed for individual, commercial and construction needs which require a source of temporary or permanent potable water supply.

BACKGROUND OF THE INVENTION

Various apparatus and devices have been proposed to transport liquids or provide a portable source of water or other liquids. In U.S. Pat. Nos. 1,892,519 to Schottgen and 2,437,618 to Schottgen et al, means for transporting liquids are disclosed. In these patents, a tank and liquid dispensing apparatus are mounted on a vehicle for transportation and delivery of liquids such as beer.

U.S. Pat. No. 4,089,446 to Logan, II et al. discloses a portable water supply and dispensing unit which includes a tank and dispensing pump assembly mounted on a pair of wheels. The apparatus is especially adapted for washing of motor vehicles.

However, deficiencies exist in the prior art with respect to providing a potable water system that is portable to service a user in need of a temporary or permanent source of potable water.

SUMMARY OF THE INVENTION

It is a first object of the present invention to provide a portable potable water system.

It is a further object of the present invention to provide a portable potable water system that maintains the potability of the water during storage and use.

It is another object of the present invention to provide a portable potable water system which is easily transportable and includes features to maintain operability of the potable water system in varying and adverse climatic conditions.

Other objects and advantages of the present invention will become apparent as the description thereof proceeds.

In satisfaction of the foregoing objects and advantages, there is provided a portable potable water system comprising a base, a tank mounted on the base, an enclosure mounted on the base and adjacent an end face of the tank, and means for filling the tank with potable water. The system also includes means for dispensing the potable water under pressure from the tank, and means for circulating the potable water from and to the tank. The means for circulating is external to the tank. Furthermore, the means for filling the tank, the means for dispensing and the means for circulating are arranged within the enclosure for protection against adverse climatic conditions.

In a preferred embodiment, a centrifugal pump is used to deliver the potable water to a desired source or user and a jet pump is utilized to provide circulation within the system. All components are selected from materials which maintain the potability of the water. The enclosure may be heated and insulated to further protect the various system components.

A method is in accordance with the invention provides a source of potable water by filling a tank with potable water, recirculating the potable water to maintain avoid freezing and dispensing the potable water on demand from a user.

BRIEF DESCRIPTION OF THE DRAWINGS

Reference is now made to the drawings accompanying the application wherein.

DESCRIPTION OF THE PREFERRED EMBODIMENTS

The portable potable water system of this invention provides an individual or commercial user with a temporary or permanent supply of potable water in the event that a source of water is unavailable. For example, a well may run dry or become contaminated such that the well water is unfit for potable water use. Alternatively, a source of continuous potable water supply may not be readily available at a site such as a construction site thereby requiring a temporary source of potable water. The inventive portable potable water system comes in various sizes depending on the particular potable water volume requirement and is easily transportable to provide immediate supply of potable water in a convenient location.

Figure 1:
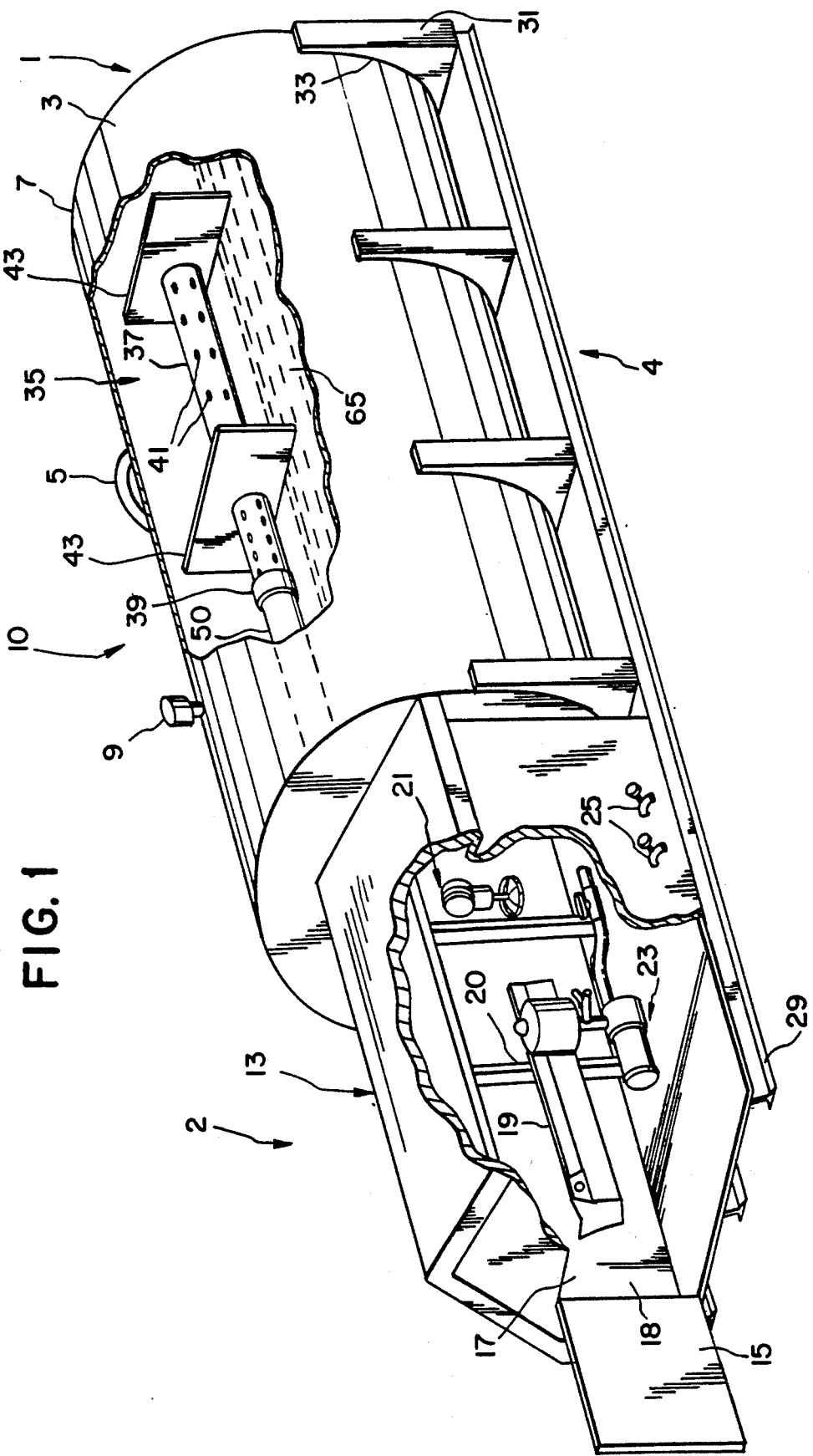
FIG. 1 is a perspective view of one embodiment of the inventive portable potable water system with portions broken away to show greater detail.

With reference now to FIG. 1, a preferred embodiment of the portable potable water system is generally designated by the reference numeral 10 and is seen to include a tank assembly 1 and an enclosure 2 mounted on a base 4.

The tank assembly 1 includes a cylindrical and elongated tank 3. The tank 3 has a lifting lug 5 attached to the top thereof, a manway 7 providing access to the interior of the tank 3 and a screened vent cap 9 for relief of pressure build up within the tank 3. Although not depicted, the vent cap 9 can include a lockable feature to prevent unauthorized access to the contents to the tank 3.

The enclosure 2 includes a building 13 mounted adjacent an end face of the tank 3. The building 13 has a door 15 for access to the interior 17 of the building 13. The door 15 may include a lock (not shown) to prevent unauthorized entry into the building 13. The building 13 may be built using stud wall construction. Insulation 18 may be provided between the studs 20 to insulate the interior 17 of the building 13 from cold or other adverse climatic conditions. This insulation helps to maintain the interior 17 of the building 13 at a temperature sufficient to prevent water in any of the potable water system lines or components from freezing.

A thermostatically controlled heating means 19 may also be arranged within the interior 17 to prevent freezing of water in any of the pump system components.

The broken-away portion of the building 13 illustrates the tank fill valve 21 and the potable water delivery system 23. Also depicted on an exterior face of the building 13 are a pair of nozzles 25 which provide an alternative source of potable water. The above-described features contained within the building 13 will be further described in conjunction with the schematic flow diagram shown in FIG. 2.

Still with reference to FIG. 1, the skid or base comprises three I-beams 29 spaced evenly across the width of the portable potable water system 10. The base of the building 13 rests across the three I-beams 29. Also attached to the I-beams 29 are a series of tank support members 31. Each of the tank support members 31 includes an arcuate surface 33 which contacts the external surface of the tank 3 and provides support therefor. Although the four tank supporting members 31 shown are spaced along the base 4, greater or fewer support members may be utilized depending on the particular size of the tank 3. Of course, other types of base structures, such as plates or wooden beams, may be utilized.

The tank may be of any size with preferred sizes ranging from 500 to 5000 gallon capacity. The length and width of the base depend on the size of the tank employed. In the preferred embodiment, the tank is 6 feet in diameter and about 116" inches in length and the base is about 152" inches in length. These dimensions are preferred since they enable the base to be easily lifted onto and transported by a flat bed type towing vehicle. Of course, other sizes may be utilized depending on the mode of transportation, including semi-permanent mounting to a vehicle.

The broken-away portion of the tank 3 illustrates the spray bar assembly 35. The spray bar assembly 35 includes a spray bar 37 in the form of an elongate tubular member. An end of the spray bar 37 may be threaded for attachment to a coupling 39. The coupling 39, as will be described hereinafter, connects to the circulating system housed within the building 13 via tube 50 which can be welded to the tank inside wall. The spray bar 37 includes a series of orifices 41 extending along its length. The orifices increase in diameter from the coupling 39 to evenly distribute flow of water therethrough when the circulation system described below is in operation.

The spray bar 37 is preferably 8 feet in length with the orifices 41 starting at 1/16 inch in diameter and enlarging to 3/16 inch in diameter. Moreover, the spray bar may be a 1 inch stainless steel pipe threaded at one end for connection to the coupling 39, and capped at the opposite end. Of course, other sizes of pipe and orifices may be used depending on the anticipated flow of recirculating potable water in the recirculation system 45.

The spray bar 37 is supported by a pair of baffle plates 43 mounted on the inside surface of the tank 3. Although the spray bar 37 is shown extending through one of the baffle plates 43, the spray bar may rest along the top edges of the baffle plates 43 or may be supported by other means within the tank 3.

The baffle plates 43, while providing support for the spray bar 37, also minimize water surge within the tank 3 during transportation of the potable water system.

Figure 2:
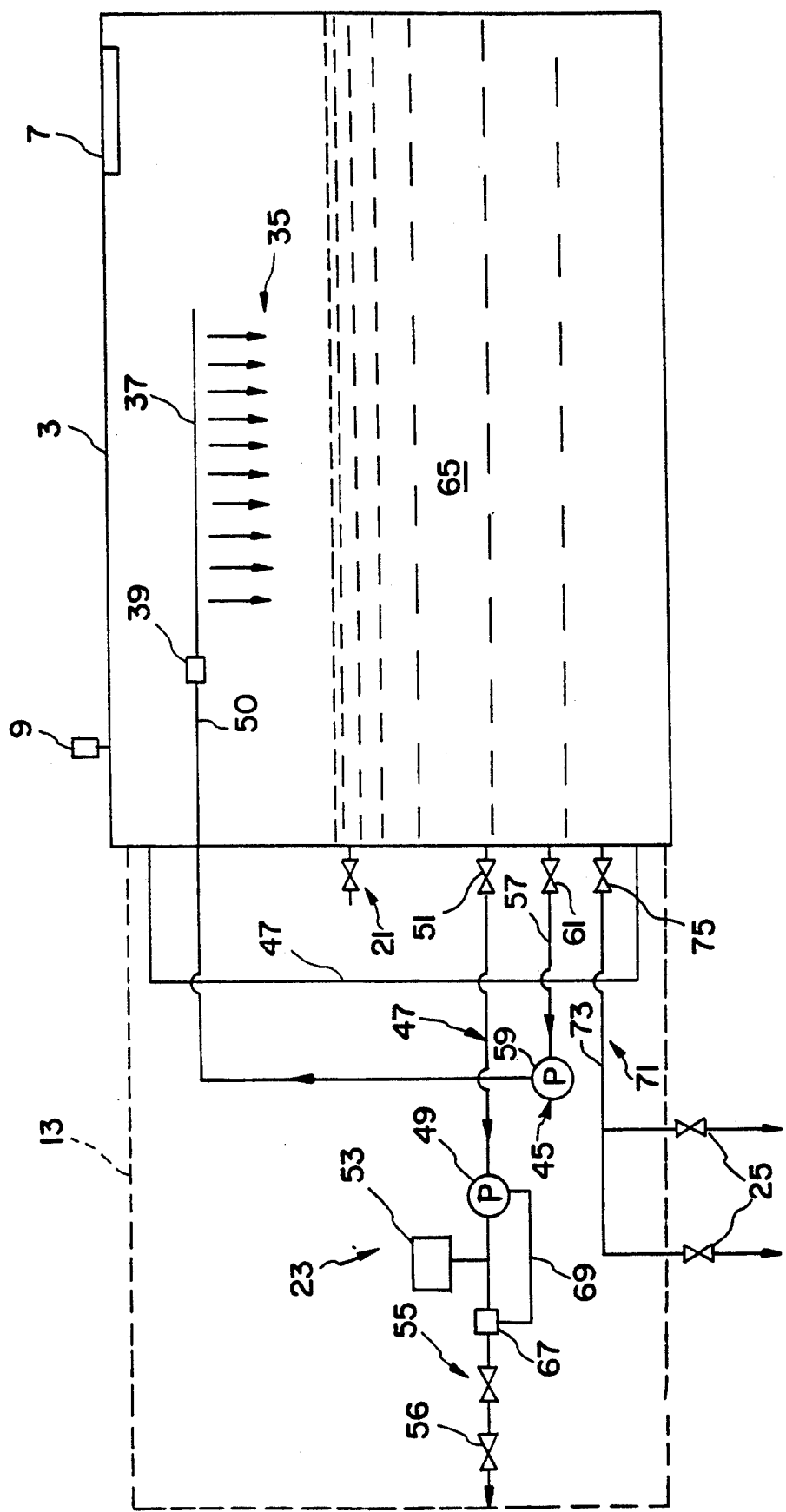
FIG. 2 is a schematic flow diagram depicting the portable potable water system components of the system of FIG. 1.

With reference now to FIG. 2, a schematic flow diagram of the various potable water system components depicts the delivery system 23, the spray bar assembly 35, a circulation system 45 and a sight glass 47. The sight glass is arranged on the face of the tank within the building 13 to permit visual inspection of the level of potable water within the tank.

The building 13 is outlined in FIG. 2 in hatched line to illustrate which components of the potable water system are within the building 13.

The fill valve 21 is connected to the tank to permit filling the tank with potable water. In a preferred embodiment, the fill valve is a three inch diameter type valve to facilitate rapid filling of the tank.

The delivery system 23 comprises a pipeline 47 interconnecting a pump 49 and the tank 3. A valve 51 is provided in the pipeline 47 for on/off control of the potable water to the pump 49. The pump 49 may be any known pump or other fluid flow device capable of delivering potable water within the tank 3 to a given site or location. In a preferred embodiment, a one half horsepower centrifugal pump can be utilized having a one and a quarter inch suction port and a three quarter inch discharge port. The preferred range of discharge pressure for the pump is 20 to 40 PSI. However, it should be understood that other pumps and other pressure conditions can be utilized depending on the particular application of the portable potable water system.

The delivery system 23 also includes an expansion tank 53 installed downstream of the pump 49. The expansion tank eliminates "water logging" and reduces the number of times the pump cycles during operation. Since these expansion tanks are well known in the art, further description thereof is not deemed necessary. Downstream of the expansion tank 53 is a check valve 55 which prevents any backflow into the delivery system 23 or the tank 3. The check valve helps maintain the potability of the water in the potable water system. Valve 56 controls flow of potable water to a user.

The delivery system 23 also includes a pressure switch 67 downstream of the expansion tank for control via lines 69 to the delivery pump 49. In a preferred embodiment, the pressure switch operates from a pressure range of 20 to 40 PSI, turning the pump on when the pressure drops below 20 PSI and turning the pump off when the pressure exceeds 40 PSI.

The circulation system 45 includes a pipeline 57 interconnecting the tank 3 and a pump 59. The pipeline 57 may also include a valve 61 to control on/off water supply to the pump 59. The pump 59 recirculates potable water from the tank 3 to the spray bar assembly 35. The circulation pump 59 pulls potable water from the bottom of the tank 3 for discharge through the spray bar to maintain full circulation of the water within the tank. The spray bar is centrally mounted within the tank 3 to evenly disperse recirculated potable water back into the tank water 65. Although the circulation pump 59 may be of any known type, a preferred embodiment includes a one-half horse power shallow well jet pump designed to deliver 632 to 714 gallons per hour between 20 and 40 PSI. Of course, other types of fluid flow delivery devices and different flow rates and pressures may be utilized to provide the necessary recirculation of the potable water.

A gravity delivery system 71 may also be included with the inventive potable water system. In this system, no electricity or pumps are required to discharge potable water from the tank 3. This system comprises a pipeline 73 interconnecting one or a pair of nozzles 25 to the tank 3. The pipeline may also include a valve 75 for on/off control of this system within the building 13. As depicted in FIG. 1, the valves 25 are arranged on an exterior face of the building 13.

The electrical components of the portable potable water system such as the circulation and delivery pumps and the heating means may be connected to an outside source of electrical power or, alternatively, powered by a battery source. The battery source may be self contained within the portable potable water system or may be provided separate therefrom.

Furthermore, a temperature sensor may be provided within the tank 3 to monitor the freezing conditions of the potable water therein. The temperature sensor and appropriate controls can be used to trigger the circulation pump 59 if the water temperature falls below a preselected level. Alternatively, the recirculating pump 59 may be cycled by a timer so that the pump operates for a given period of time to maintain the potability of the water within a tank 3.

The tank components, including the baffles 43, the spray bar 37, coupling 39 and pipe 50 are preferably constructed of an austenitic grade of stainless steel, preferably 304 stainless steel. In addition, any fitting or connections made within the tank should also be made of 304 stainless steel. Fittings outside the tank are preferably made using PVC pipe or the like.

The heater 19 shown in FIG. 1 can also be thermostatically controlled to maintain a predetermined temperature within the building 13.

In operation, the tank 3 is filled via valve 21 with potable water. The portable potable water system is transported to the desired location. Either or both delivery systems 23 and 71 are connected to a system such as a house or building for supply of potable water in a predetermined cycle during operation. The enclosure can be secured by locking to prevent unauthorized access and house the system components against the weather.

As such, an invention has been disclosed in terms of preferred embodiments thereof which fulfills each and every one of the objects of the present invention as set forth hereinabove and provides a new and improved portable potable water system.

Of course, various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. A portable potable water system comprising:
   a) a base;
   b) a tank mounted on said base;
   c) an enclosure mounted on said base and adjacent an end face of said tank;
   d) means for filling said tank with potable water;
   e) means for dispensing said potable water under pressure from said tank; and
   f) means for circulating said potable water intermittently form and to said tank, said means for circulating being external to said tank and being independent of said dispensing means so that potable water can be circulated without being dispensed;
   g) wherein, said means for filling said tank, said means for dispensing and said means for circulating are housed by said enclosure for protection against adverse climatic conditions.

2. The portable potable water system of claim 1 wherein said means for dispensing said potable water further comprises a deliver pump connected to said tank for dispensing said potable water under pressure and a check valve downstream of said delivery pump to prevent backflow and contamination of said potable water in said tank.

3. The portable potable water system of claim 2 further comprising an expansion tank arranged downstream of said delivery pump and upstream of said check valve and a pressure switch arranged downstream of said delivery pump, said pressure switch controlling delivery pump operation within a predetermined pressure range.

4. The portable potable water system of claim 1 wherein said means for circulating further comprises a circulation pump connected to said tank and an elongated tube mounted within said tank, said elongated tube having a plurality of orifices along a length thereof, said elongated tube connected to said circulation pump, and said circulation pump circulating potable water from said tank and back to said tank via said plurality of orifices.

5. The portable potable water system of claim 4 wherein said orifices increase in size along said length of said elongated tube to evenly distribute flow of potable water through said orifices.

6. The portable potable water system of claim 1 wherein said tank includes a pair of baffles arranged laterally therein for controlling surge in said tank.

7. The portable potable water system of claim 4 wherein said tank includes a pair of baffles arranged laterally therein, said pair of baffles providing support for said elongated tube.

8. The portable potable water system of claim 1 wherein said enclosure has an access door and includes means for insulating and heating said enclosure.

9. The portable potable water system of claim 1 wherein said tank includes a lifting lug attached thereto, a screened vent cap and a removable opening for access to an interior of said tank.

10. The portable potable water system of claim 1 wherein said tank and all fittings attached thereto are made of stainless steel.

11. The portable potable water system of claim 1 wherein said means for dispensing said potable water further comprises a pipeline and valve arrangement, said pipeline in communication with said tank at a location such that head pressure of potable water in said tank causes said potable water to flow through said pipeline and valve arrangement.

12. The portable potable water system of claim 2 wherein said means for dispensing said potable water further includes a pipeline and valve arrangement, said pipeline in communication with said tank at a location such that head pressure of potable water in said tank causes potable water to flow through said pipeline and valve arrangement.

13. A portable potable water system comprising:
   a) a base;
   b) a tank mounted on said base;
   c) an insulated enclosure mounted on said base and adjacent an end face of said tank and having an access opening therein;
   d) a filling valve mounted on said tank and within said enclosure;
   e) a delivery pump mounted within said enclosure and in communication with said tank for dispensing potable water therefrom;
   f) an elongated tube mounted within said tank and having a plurality of orifices;
   g) a circulating pump in communication with said tank on a suction side of said circulating pump and in communication with said elongated tube on a discharge side of said circulating pump for circulating potable water from and to said tank, said circulating pump mounted within said enclosure; and
   h) a thermostatically controlled heater mounted within said enclosure.

14. The portable potable water system of claim 13 further including a dispensing pipeline and valve arrangement, said pipeline in communication with said tank such that head pressure of potable water in said tank causes flow of potable water through said pipeline and valve arrangement.

15. The portable potable water system of claim 14 wherein said valve arrangement is mounted outside said enclosure for supplying potable water to a user.

16. A method of providing a portable and potable source of water comprising the steps of:
   a) providing a portable potable water system comprising:
      i) a base;
      ii) a tank mounted on said base;
      iii) an enclosure mounted on said base and adjacent an end face of said tank;
      iv) means for filling said tank with potable water;
      v) means for dispensing said potable water under pressure form said tank; and
      vi) means for circulating said potable water intermittently form and to said tank, said means for circulating being external to said tank and being independent of said dispensing means so that potable can be circulated without being dispensed;
      vii) wherein, said means for filling said tank, said means for dispensing and said means for circulating are housed by said enclosure for protection against adverse climatic conditions;
   b) filling said tank with potable water;
   c) circulating said potable water using said circulating means; and
   d) dispensing said potable water upon demand to a user.

17. The method of claim 15 further comprising the step of maintaining said enclosure at a temperature above freezing.

18. The method of claim 15 further comprising the step of circulating said potable water in said tank in a predetermined cycle.

* * * * *